US011865586B2

(12) United States Patent
Berger et al.

(10) Patent No.: US 11,865,586 B2
(45) Date of Patent: Jan. 9, 2024

(54) METHOD FOR SORTING PIECES OF LUGGAGE AND LUGGAGE SORTING SYSTEM

(71) Applicant: SIEMENS LOGISTICS GMBH, Nuremberg (DE)

(72) Inventors: Gisbert Berger, Berlin (DE); Svetlozar Delianski, Berlin (DE); Ulrich Dengler, Constance (DE); Joerg Rottland, Radolfzell (DE)

(73) Assignee: Siemens Logistics GmbH, Nuremberg (DE)

(*) Notice: Subject to any disclaimer, the term of this patent is extended or adjusted under 35 U.S.C. 154(b) by 302 days.

(21) Appl. No.: 16/077,547

(22) PCT Filed: Nov. 15, 2016

(86) PCT No.: PCT/EP2016/077724

§ 371 (c)(1),
(2) Date: Aug. 13, 2018

(87) PCT Pub. No.: WO2017/137106

PCT Pub. Date: Aug. 17, 2017

(65) Prior Publication Data

US 2019/0039098 A1 Feb. 7, 2019

(30) Foreign Application Priority Data

Feb. 11, 2016 (EP) .................................... 16155151

(51) Int. Cl.
*B07C 3/14* (2006.01)

(52) U.S. Cl.
CPC ........ *B07C 3/14* (2013.01); *B07C 2301/0066* (2013.01)

(58) Field of Classification Search
CPC ..... B07C 3/14; B07C 3/20; B07C 2301/0066; B64F 1/368; G06F 16/5854
See application file for complete search history.

(56) References Cited

U.S. PATENT DOCUMENTS 3,915,284 A 10/1975 Knockeart et al.
4,776,464 A 10/1988 Miller et al.
5,249,687 A 10/1993 Rosenbaum et al.
5,770,841 A * 6/1998 Moed ........................ B07C 3/00 235/375

(Continued)

FOREIGN PATENT DOCUMENTS

CN 101643117 A 2/2010
CN 101765853 A 6/2010

(Continued)

*Primary Examiner* — Michael McCullough
*Assistant Examiner* — Kalyanavenkateshware Kumar
(74) *Attorney, Agent, or Firm* — Laurence A. Greenberg; Werner H. Stemer; Ralph E. Locher

(57) ABSTRACT

Pieces of luggage are sorted which each carries an identification element with a set of information in the form of plaintext. In order to sort pieces of luggage efficiently, at least a portion of the set of information on the identification element is detected automatically and recognized automatically. During an examination, it is automatically verified whether the recognized portion of the set of information matches at least one set of data stored in a database.

18 Claims, 2 Drawing Sheets

(56) References Cited

U.S. PATENT DOCUMENTS

| | | | | |
|---|---|---|---|---|
| 8,031,903 | B2 | 10/2011 | Paresi et al. | |
| 8,258,926 | B2 | 9/2012 | Bayer et al. | |
| 8,301,296 | B2 | 10/2012 | Grundmann et al. | |
| 2004/0199403 | A1 | 10/2004 | Ananda | |
| 2005/0008120 | A1 | 1/2005 | Ellenbogen | |
| 2005/0091088 | A1* | 4/2005 | Peterson | G06Q 10/02 705/5 |
| 2005/0119786 | A1* | 6/2005 | Kadaba | B07C 3/00 700/224 |
| 2007/0109127 | A1 | 5/2007 | Johnson et al. | |
| 2009/0308918 | A1 | 12/2009 | Wilke | |
| 2012/0263350 | A1 | 10/2012 | Delianski | |
| 2014/0119605 | A1 | 5/2014 | Zobel | |
| 2014/0168374 | A1 | 6/2014 | Bunkers | |
| 2014/0305850 | A1 | 10/2014 | Serjeantson et al. | |
| 2016/0075449 | A1 | 3/2016 | Ziegler | |
| 2016/0371306 | A1* | 12/2016 | Dengler | G06Q 10/08 |
| 2017/0061179 | A1* | 3/2017 | Delianski | B07C 3/20 |

FOREIGN PATENT DOCUMENTS

| | | | |
|---|---|---|---|
| CN | 105143047 | A | 12/2015 |
| DE | 10040550 | A1 | 3/2002 |
| DE | 60215932 | T2 | 9/2007 |
| DE | 102009016628 | A1 | 12/2009 |
| DE | 102009060057 | A1 | 6/2011 |
| DE | 102014106448 | A1 | 11/2015 |
| DE | 202015006102 | U1 | 12/2015 |
| GB | 2518160 | A | 3/2015 |
| WO | 9711790 | A1 | 4/1997 |
| WO | 2016166686 | A1 | 10/2016 |

* cited by examiner

METHOD FOR SORTING PIECES OF LUGGAGE AND LUGGAGE SORTING SYSTEM

BACKGROUND OF THE INVENTION

Field of the Invention

The invention relates to a method for sorting pieces of luggage, each of which includes an identification element comprising a dataset in the form of plain text.

In air travel, the checked luggage is usually provided with a luggage label in order to be able to sort the piece of luggage in the course of transportation or, for example, assign the item to a destination, to a passenger's name and/or to other information, for example. A barcode and further transportation-relevant information such as the luggage number, the flight number, the destination airport and optionally the passenger's name, are generally found on this luggage label. Usually, in the course of transportation, the barcode is read in order to be able to carry out sorting/categorization. The barcode is used to encode the luggage number for which, in turn, the flight number and further transportation-relevant information are stored.

A luggage label is often damaged during the transportation of the piece of luggage (for example during transportation along luggage carousels or conveyor belts, during loading of the aircraft, and/or during unloading of the aircraft). In particular, the luggage label can be bent and/or twisted, the luggage label can get dirty, parts of the luggage label can be torn off and/or scraped off and/or suchlike. In the case of a damaged luggage label, the barcode can no longer be recognized, such that the luggage label has to be read by hand. This results in increased labor costs. Furthermore, delays occur during sorting/categorization. In some cases, it may even happen, as a result of the delays, that a connecting flight can no longer be caught.

SUMMARY OF THE INVENTION

The present invention addresses the problem of providing a method with which the sorting of pieces of luggage can be carried out more efficiently.

This problem is solved according to the invention by a method for sorting pieces of luggage, in which method the pieces of luggage each include an identification element comprising an information set in the form of plain text and in which at least one part of the information set in the identification element is automatically acquired and also automatically recognized and in which it is automatically verified during a check whether the part of the information set that has been recognized matches at least one dataset that is stored in a database.

The invention takes as its point of departure the consideration that automatic acquisition of the identification element, in particular of the plain text thereof, enables efficient, in particular fast and labor-saving processing. Furthermore, automatic checking allows an efficient, in particular a fast and labor-saving check.

By means of automatic checking, different versions of the text can be processed quickly and in a labor-saving manner and/or probabilities for the individual versions of the text can be taken into account. Furthermore, automatic checking also allows further data sources, such as a flight schedule, to be taken into account in order to check whether the information set that has been acquired is plausible. For example, it can be verified whether a flight number that has been acquired exists in the current flight schedule and is therefore plausible—otherwise this version of the text can be ruled out.

The sorting preferably takes place in an airport. "Luggage sorting" can be understood as "luggage categorization". In particular, during sorting, information can be assigned to a piece of luggage regarding the destination to which the piece of luggage is to be transported. In this case, the destination can be, for example, a specific gate, a specific loading zone, a specific aircraft, a specific luggage transportation means (in particular a certain luggage conveyor), a destination airport or suchlike.

A piece of luggage can be, for example, a suitcase, a traveling bag, a bulky piece of luggage, sports equipment or any other piece of luggage. Furthermore, the identification element can be a luggage label, also known as a label sleeve or luggage label.

The "acquisition" of part of the information set can be interpreted as optical acquisition. For example, the acquisition can be carried out by means of a reader, in particular a scanner and/or a camera.

An at least partly automatic data acquisition can be interpreted as "automatic acquisition". This means that the acquisition can include a handling operative. For example, the acquisition can be carried out by means of a hand-held reader, in particular a hand-held scanner, and/or a hand-held camera. Furthermore, the acquisition of the information set can be carried out in a fully automatic manner.

The "recognition" of the part of the information set can be understood to mean a read-out, in particular a read-out by means of software. For example, the recognition/readout can be carried out by means of text recognition software. Furthermore, during the recognition, the recognized part of the information set can be converted into a form that can be read by a computer/by software.

The information set is present in the form of plain text. This means that the information set preferably includes a text that can be read by humans, in particular a plurality of letters and/or figures.

Advantageously, it is possible to read how the luggage is to be sorted from the information set in the form of plain text. In particular, a person skilled in the art can read directly from the information set how the piece of luggage is to be sorted. Furthermore, it is advantageous if it is possible to read from the information set the destination to which the piece of luggage is to be transported.

For example, the information set can include a code for a destination airport. Using the destination airport code, it is possible to recognize the destination airport to which the piece of luggage is to be transported. As a rule, this airport code is shown larger than other information, such that the automatic acquisition thereof can be achieved more easily.

The information set can further include a barcode. A coded form of information (items) can be understood to be a barcode. The information set can preferably be derived from the barcode. Furthermore, the barcode can be derived from the information set.

Usefully, a piece of information that differs from the barcode itself is acquired and recognized, which information that has been acquired and recognized is preferably located directly on the identification element.

Through one or a plurality of random items of information preferably being recognized in plain text form, it can become possible to match different and/or a plurality of items of information with the database.

Furthermore, it is useful if the part of the information set in the identification element that has been acquired differs from a plain text representation of the barcode. The plain text representation of the barcode can be, for example, a luggage number. This means that the information set includes at least one information item that does not match the plain text representation of the barcode.

Furthermore, the information set can include plain text that differs from the plain text representation of a barcode. In particular, if the part of the plain text that has been acquired differs from a plain text representation of the barcode, it is preferably possible to dispense with a plain text representation of the barcode. Furthermore, automatic acquisition of at least part of the information set can allow the barcode to be completely dispensed with.

It is advantageous if during the check, there is verification regarding which dataset in the database is the closest match with the part of the information set that has been acquired. For example, the part of the information set that has been acquired can be compared on a character-by-character basis with the at least one dataset in the database.

Usefully, on the basis of the check, in particular when the part of the information set that has been recognized is used, the destination to which the piece of luggage is to be transported is automatically determined. In particular, it can be determined automatically during the check as to with which of a plurality of available luggage transportation means the piece of luggage is to be transported. A luggage transportation means can be, for example, a luggage conveyor and/or a luggage tray. Sorting of the piece of luggage is preferably carried out automatically according to what has been determined.

The part of the information set is preferably acquired by an information acquisition device, in particular by a reader. Furthermore, it is advantageous if the part of the information set is recognized by means of optical text recognition, in particular by means of OCR (optical character recognition). Optical text recognition can be carried out using text recognition software. Optical text recognition can, for example, recognize the part of the information set in the form of plain text, character by character. It is possible that a different part of the information set cannot be acquired and/or cannot be recognized, for example because this other part has been damaged.

It is advantageous if hypotheses are set up using optical text recognition, in particular using optical text recognition software, regarding what text could appear on the identification element. For example, a plurality of versions of the text can be generated using optical text recognition. Furthermore, optical text recognition can specify a probability and/or reliability for each version of the text. Furthermore, the version of the text with the highest probability and/or reliability is considered, for example, to be the part of the information set that has been recognized. If the part of the information set that has been recognized does not match any of the datasets, the part of the information set that has been recognized can be replaced with another one of the versions of the text, which is then preferably compared with the database.

Usefully, for the purpose of the check, the text versions that have been generated are compared with the datasets in the database. Furthermore, it is determined which of the versions of the text is the best match with one of the datasets.

If the part of the information set that has been recognized matches a dataset in the database, then it is preferably possible to identify how the piece of luggage is to be sorted.

Advantageously, the information set includes a plurality of information items. Furthermore, it is useful if at least one of the information items is at least partly recognized. It is preferable if at least one of the information items is fully recognized. Furthermore, at least two of the information items can be at least partly recognized.

The information set can include as information a luggage number. In a preferred embodiment of the invention, the information set includes as information a boarding number, a passenger's name, a flight number, a departure airport code, a transit airport code, and/or a destination airport code. The information set can include further information, such as, for example, a flight date. The flight date can include the day, month and/or time of the flight. The part of the information set which is automatically acquired and recognized is usefully at least part of this information. The departure airport, the transit airport or the destination airport can be the respective airports for the piece of luggage.

Furthermore, it is useful for the dataset to be a luggage number, a boarding number, a passenger name, a flight number, a code for a departure airport, a code for a transit airport and/or a code for a destination airport. In addition, the dataset can include further information, such as, for example, a flight date.

Through one or a plurality of random information items in the information set preferably being at least partly recognized, it can become possible to match different information items with the database.

Preferably, a plurality of the information items in the information set are recognized. Furthermore, it is advantageous if during the check it is verified whether the plurality of information items matches at least one dataset in the database.

Furthermore, a part of the information set can be at least partly recognized and compared with a plurality of datasets in the database. Furthermore, if the part of the information set does not match any of the datasets, the information set can be replaced with the dataset that constitutes the closest match with the information set.

In an advantageous embodiment of the invention, the database is a dynamic database. Usefully, the datasets in the dynamic database are generated automatically.

Furthermore, the datasets in the dynamic database can be generated autonomously. Usefully, the dynamic database is constantly updated, in particular at one-second intervals. A dataset preferably includes information regarding the destination to which a piece of luggage is to be transported.

The information set is advantageously transmitted to the database when the identification element is created. Furthermore, the identification set transmitted to the database is stored in the database as a dataset.

The piece of luggage can be an item of flight luggage. Furthermore, the piece of luggage can be sorted at an airport.

In particular, the dataset can be stored or generated in the database when the piece of luggage is checked in at the airport, for example, at check-in. The generation of the dataset can take place, for example, at the same time as the generation of the identification element or there can be a time-lag.

This means that an airport at which the piece of luggage is sorted may have created the dataset itself, in particular when the airport is the departure airport.

It is advantageous if a dataset generated from the information set is transmitted to all the airports involved in the transportation of a piece of luggage, for example to a departure airport, to a destination airport, and/or to a transit airport.

This means that an airport at which the piece of luggage is sorted may have received the dataset from a different airport, in particular when the airport at which the piece of luggage is sorted is a transit airport or a destination airport for the piece of luggage. In this way, it can be guaranteed that each of the airports involved can access the full dataset. If the identification element is read at one of the airports involved, the part of the information set that has been acquired can then be directly compared with the at least one dataset, irrespective of at which of the airports involved the piece of luggage happens to be located. As a rule, the identification element only becomes damaged when the piece of luggage is transported, such that it is precisely at the transit airport or at the destination airport that there is a need to compare the identification element with the at least one dataset.

Furthermore, it is possible to determine in the database when the piece of luggage arrives at its luggage destination. The luggage destination can be, for example, a specific luggage reclaim belt in the destination airport. The dataset relating to said piece of luggage is preferably deleted after a predetermined period of time, in particular after 24 hours have elapsed since the arrival of the piece of luggage at the luggage destination.

It is advantageous if the database at least partly includes information relating to a flight schedule. The flight schedule can include flight numbers of incoming aircraft and/or departing aircraft, their departure airport, their destination airport and/or their landing time. Furthermore, it is preferable if, during the check, it is verified whether the part of the information set that has been recognized matches at least one of the items of flight schedule information that are stored in the database. In particular, during the check, it can be verified whether the part of the information set that has been recognized is plausible.

For example, it can be verified during the check whether the flight number that has been recognized exists at all, whether the flight with the flight number that has been recognized has already landed in fact, whether the flight from the airport that has been recognized has already landed at all and/or suchlike. If an information item that has been recognized is not plausible, a different version of the information set may be more probable.

The flight schedule is preferably the current flight schedule, that is, the flight schedule for the last 48 hours and the next 96 hours, preferably the flight schedule for the last 24 hours and the next 48 hours.

The invention further relates to a luggage sorting system. The luggage sorting system according to the invention includes an information acquisition device for the automatic acquisition of the information set in the form of plain text, and a checking unit that is equipped to verify automatically during a check whether a part of the information set that has been recognized matches at least one dataset that is stored in a database.

The luggage sorting system according to the invention can be the luggage sorting system previously mentioned in connection with the method. Consequently, the elements of the luggage sorting system mentioned hereinafter can be the elements previously mentioned in connection with the method.

The information acquisition apparatus is preferably a reader. Furthermore, the reader can detect at least part of the information set. In addition, the reader can transmit the part of the information set that has been acquired to text recognition software. Preferably, optical text recognition can be carried out using the text recognition software. For example, the checking unit can include the text recognition software.

Furthermore, the checking unit can include the database. Furthermore, the checking unit can have access to the database, in particular access to a storage medium on which the database is stored.

The information acquisition apparatus and the checking unit are usefully connected to each other by a cable, in particular by a data transfer cable.

The description of advantageous embodiments of the invention provided so far contains numerous features, some of which are featured in a plural combination in the individual sub-claims. However, these features can usefully also be considered individually and combined into meaningful further combinations. In particular, these features can each be combined on an individual basis and in any suitable combination with the method according to the invention and with the luggage sorting system according to the invention. Therefore, process features are also to be seen as being formulated substantively and as a property of the corresponding luggage sorting system and vice versa.

Even if in the description or in the claims some terms are used in the singular or in connection with a numeral, the scope of the invention shall not be restricted to the singular or to the respective numeral for these terms.

The aforementioned properties, features and advantages of the present invention and the manner in which they are achieved, will become clearer and easier to understand in connection with the description that follows of the exemplary embodiments, which are explained in more detail in connection with the drawing. The exemplary embodiments serve to explain the invention and do not restrict the invention to the combination of features specified therein, nor with regard to functional features. In addition, features of each exemplary embodiment that are appropriate for this purpose can also be considered explicitly in isolation, extracted from an exemplary embodiment, incorporated into another exemplary embodiment for the supplementation thereof and combined with any one of the claims.

DESCRIPTION OF THE INVENTION

Figure 1:
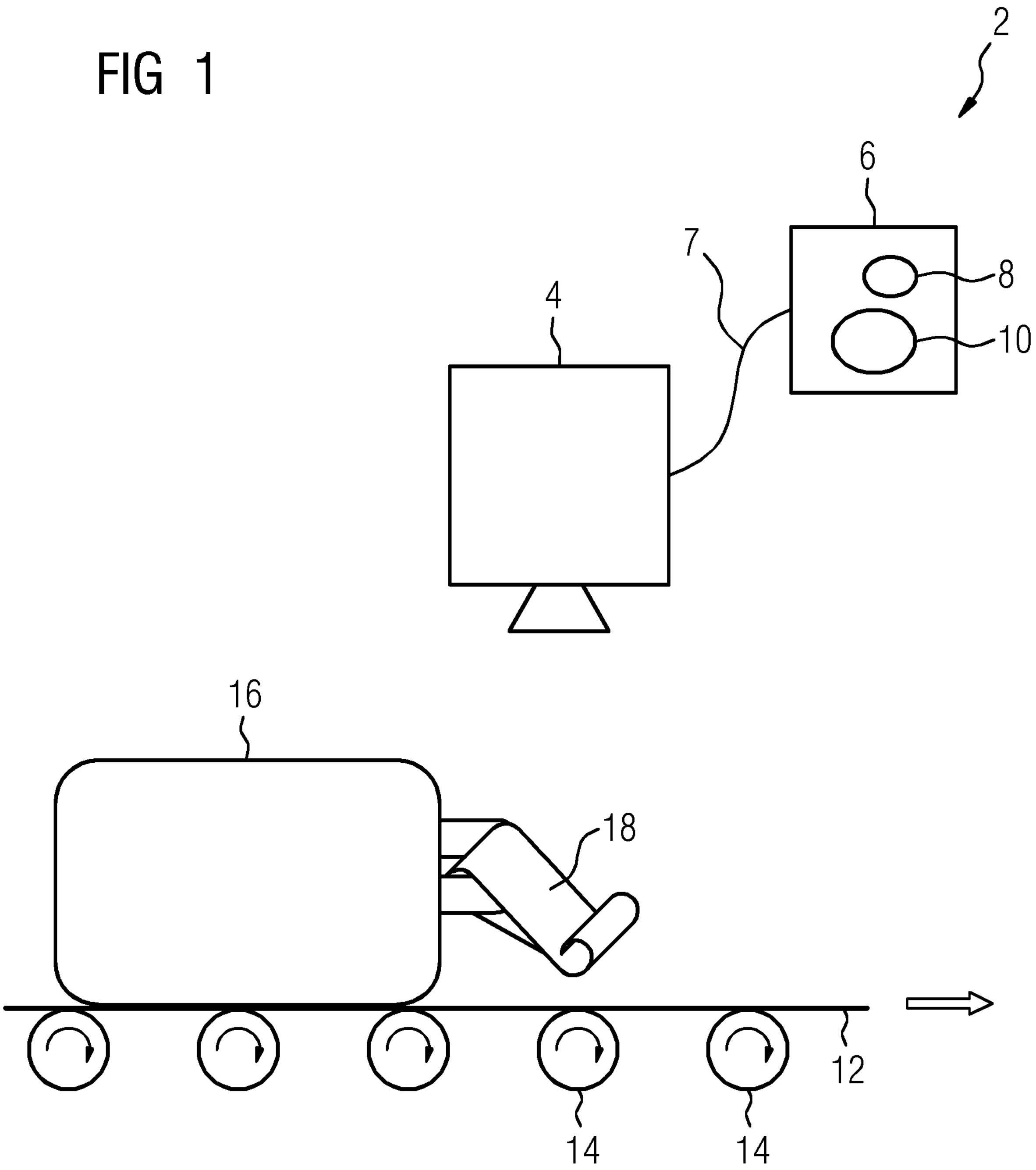
FIG. 1 shows a luggage sorting system with an information acquisition system and a checking unit.

FIG. 1 shows schematically a luggage sorting system 2 with an information acquisition apparatus 4. The information acquisition apparatus 4 is designed as a reader, in particular as a camera. The luggage sorting system 2 further includes a checking unit 6. In addition, the checking unit 6 and the information acquisition apparatus 4 are connected to each other by means of a cable 7, in particular by a data transfer cable. The checking unit 6 includes text recognition software 8 for optical text recognition. The checking unit 6 further includes a database 10. The database 10 further includes a plurality of datasets. The database 10 is a dynamic database in which the datasets are generated or stored automatically. In particular, an information set 22 is transmitted to the database 10 when an identification element 18 is created, and is stored in the database 10 as a dataset. The identification element 22 is created during the check-in of a piece of luggage 16, for example in a departure airport.

In addition, FIG. 1 shows a luggage conveyor 12, which runs over rollers 14. The directions of movement of the rollers 14 and of the luggage conveyor 12 are shown by arrows. In principle, the piece of luggage could also be transported, for example, by means of luggage trays and/or different luggage transportation means.

The piece of luggage 16, in particular a piece of flight luggage, is located on the luggage conveyor 12. The identification element 18, in particular a luggage label, is attached to the piece of luggage 16. The identification element 18 includes the information set 22 in the form of plain text (cf. FIG. 2 and FIG. 3).

The information acquisition apparatus 4 is equipped to automatically acquire the information set 22 in the form of plain text. At the same time, at least part of the information set 22 in the identification element 18 is acquired automatically. Furthermore, at least part of the information set 22 is recognized automatically, in particular by means of the text recognition software 8. In addition, in a check, in particular using the checking unit 6, it is verified automatically whether the part of the information set 22 that has been recognized matches at least one dataset that is stored in the database 10.

Figure 2:
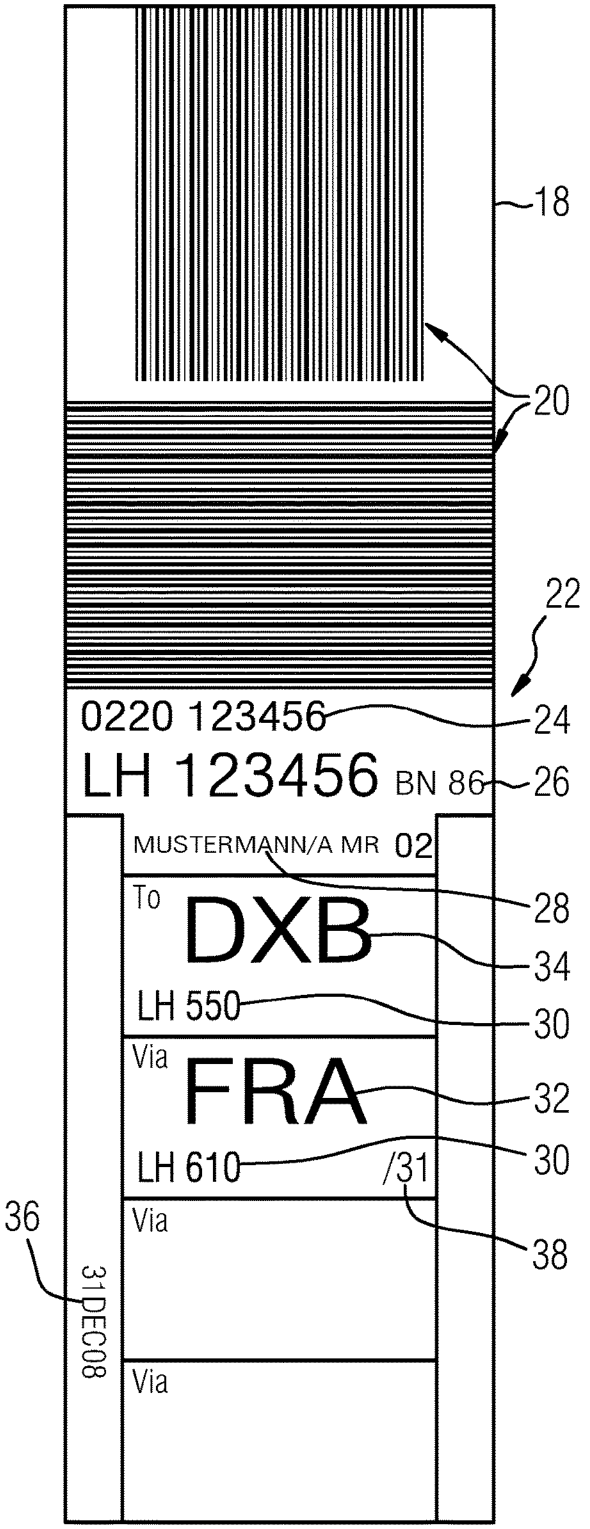
FIG. 2 shows an intact identification element.

The information set 22 in the identification element 18 is provided in the form of plain text (see FIG. 2). The information set further includes a plurality of information items 24, 26, 28, 30, 32, 34, 36, 38 (see FIG. 2).

FIG. 2 shows schematically an intact identification element 18. The identification element 18 includes a barcode 20, which is printed horizontally and vertically. Furthermore, the identification element 18 includes an information set 22 in the form of plain text. The information set 22 in turn includes as information items a boarding number 26, a passenger's name 28, a code for a transit airport 32, as well as the relevant flight number 30 and a code for a destination airport 34 as well as the relevant flight number 30. Furthermore, the information set 22 includes a date of issue 36 and a flight date 38. In addition, the information set 22 includes a luggage number 24, which matches the plain text representation of the barcode 20.

Figure 3:
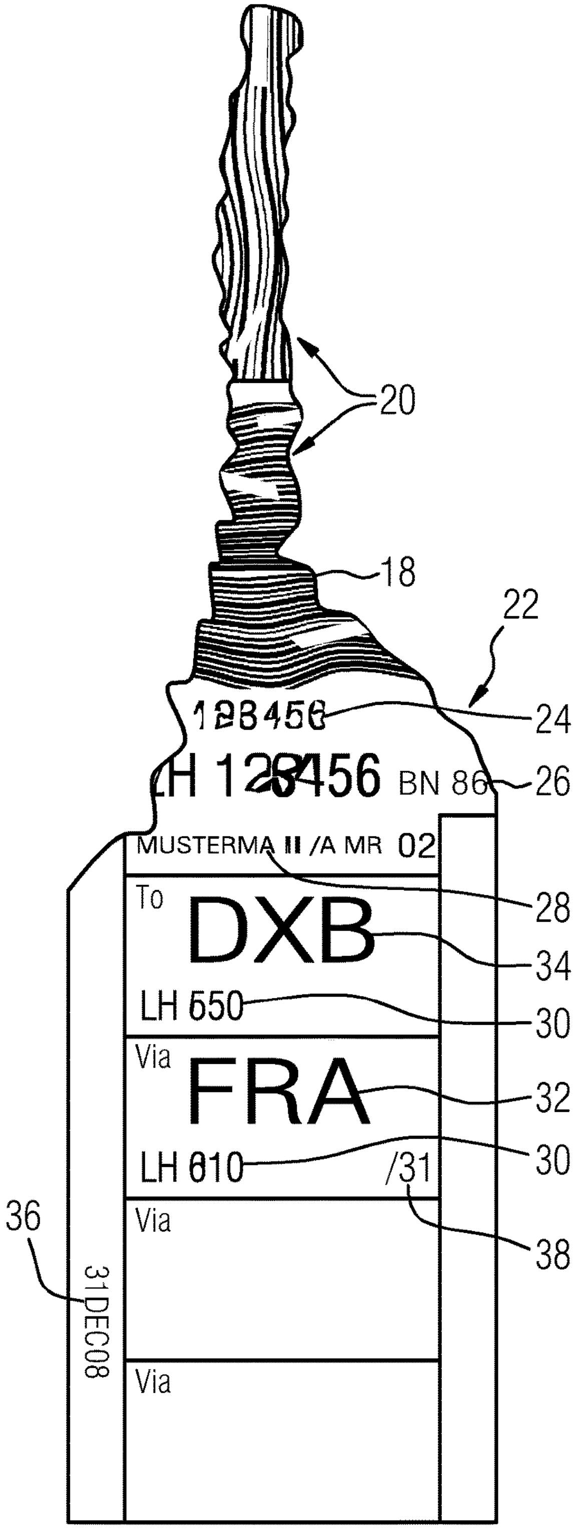
FIG. 3 shows a damaged identification element.

FIG. 3 shows, by way of example, the identification element 18 from FIG. 2, which is now damaged, in particular twisted and stuck together. For example, a piece of luggage 16 with such a damaged identification element 18 arrives at a transit airport and has to be sorted.

In the case of the damaged identification element 18, the barcode 20 and the luggage number 24 are damaged in such a way that these items of information 20, 24 are now illegible. Part of the information set 22 can be acquired and recognized with the aid of the luggage sorting system 2 shown in FIG. 1. The text recognition (software) 8 recognizes the part of the information set 22 character by character yet a different, damaged part of the information set 22 cannot be acquired and/or recognized. In this case, the optical text recognition 8 at least partly recognizes a plurality of information items 26, 28, 30, 32, 34 pertaining to the information set 22. For example, part of the passenger's name 28, such as MUSTERMA, can be recognized, and a different part of the passenger's name 28 cannot be recognized because the characters in the other part, for example NN, are damaged and therefore illegible. Furthermore, for example, the code for the destination airport 34 is fully recognized.

The text recognition (software) 8 from FIG. 1 provides hypotheses as to what text could appear on the identification element 18. For example, a plurality of versions of the text can be generated by means of the optical text recognition 8. Furthermore, the optical text recognition 8 indicates a probability for each version of the text. For instance, for the flight number 30 to the destination airport, the optical text recognition 8 creates the versions of the text LH 550, LH 650 and LH 850 with the probabilities 40%, 50%, and 10%. Furthermore, the version of the text with the greatest probability (in this case LH 650) can be considered, for example, to be recognized information in the part of the information set 22 that has been recognized.

The database 10 at the transit airport at which the piece of luggage 16 is to be sorted has received the dataset from a departure airport of the piece of luggage 16. This means that, at the departure airport, the dataset relating to the piece of luggage 16 was generated, and said dataset was then transmitted to all the airports involved, that is, to the transit airport and to the destination airport. The checking unit 6 (at the transit airport) can thus access a full dataset. In this example, the part of the information set 22 that has been recognized does not match any of the datasets, such that the part of the information set 22 that has been recognized can be replaced with a further one of the versions of the text (for example, the flight number LH 650 that has been recognized 30 can be replaced by the different version of the text LH 550 in the part of the information set 22 that has been recognized), which different version of the text is then preferably compared with the database 10.

Furthermore, the database 10 contains a flight schedule for the transit airport. The information set can be further compared with the flight schedule. In this way, flight numbers 30 and airport codes 32, 34 can be compared with the flight schedule and it is possible to determine whether the information items that have been recognized are plausible. The flight number LH 650, 30, to the destination airport of the piece of luggage 16 is not plausible, for example, if a flight with such a flight number 30 is not leaving within the next 24 hours. In addition, the code for the destination airport 34 in the information set 22 can be compared, for instance, with the airports at which departing aircraft land that are recorded in the flight schedule, and in the event of a match, for example, possible flight numbers 30 to the destination airport can be deduced.

Furthermore, with the aid of the luggage sorting system 2 shown in FIG. 1, it is verified during a check which dataset in the database 10 is the closest match with the part of the information set 22 that has been recognized. At the same time, in the check, it is verified whether the plurality of information items that have been recognized or parts of the information in the information set 22 match at least one dataset in the database 10. In this way, the piece of luggage 16 can be assigned to a destination and/or to a different item of information, that is, the piece of luggage 16 can be sorted.

On the basis of the check, in particular using the part of the information set 22 that has been recognized, the destination to which the piece of luggage 16 is to be transported is automatically determined. The sorting of the piece of luggage 16 is preferably carried out automatically according to what has been determined.

In principle, it is also possible for items of information pertaining to the identification element other than those mentioned here (for example the date of issue 36 and the flight date 38) to be acquired and recognized and also used for the comparison with the datasets in the database.

Although the invention has been illustrated and described in greater detail by means of the preferred exemplary embodiments, the invention is not therefore restricted by the examples disclosed and other variants can be derived therefrom by a person skilled in the art, without going beyond the scope of the invention.

LIST OF REFERENCE CHARACTERS

2 Luggage sorting system
4 Information acquisition apparatus
6 Checking unit
7 Cable
8 Text recognition (software)
10 Database
12 Luggage conveyor
14 Roller
16 Piece of luggage
18 Identification element
20 Barcode
22 Information set
24 Luggage number
26 Boarding number
28 Passenger's name
30 Flight number
32 Code for the transit airport
34 Code for the destination airport
36 Date of issue
38 Flight date

The invention claimed is:

1. A method of sorting pieces of luggage, the method comprising:

generating for each piece of luggage an information set including a machine-readable code and human-readable code, and storing the information set as a dataset in a database;

providing each piece of luggage with an identification element carrying the information set with the machine-readable code and human-readable code;

during a sorting process, automatically acquiring and automatically recognizing at least part of the information set in the identification element by acquiring the machine-readable code and, if the machine readable code is not recognizable, automatically acquiring the human-readable code from the identification element;

performing a check to thereby automatically verify whether the part of the information set that has been recognized matches at least one dataset that is stored in the database; and sorting the respective piece of luggage according to information gleaned from the dataset that is stored in the database.

2. The method according to claim 1, wherein the identification element includes a barcode and the part of the information set in the identification element that has been acquired differs from a plain text representation of the barcode.

3. The method according to claim 1, wherein the check comprises verifying which dataset in the database has a closest match with the part of the information set that has been acquired.

4. The method according to claim 1, wherein the check comprises automatically determining a destination to which the piece of luggage is to be transported.

5. The method according to claim 1, which comprises performing the step of acquiring the part of the information set with an information acquisition apparatus and using optical text recognition for recognizing the part of the information set.

6. The method according to claim 1, wherein the information set includes a plurality of information items and the at least one of the information items is at least partly recognized.

7. The method according to claim 1, wherein:

the information set in the identification element includes at least one information item selected from the group consisting of a luggage number, a boarding number, a passenger's name, a flight number, a code for a departure airport, a code for a transit airport, and a code for a destination airport; and the part of the information set that is automatically acquired and recognized is at least a part of the information items of the group.

8. The method according to claim 7, which comprises recognizing a plurality of the information items in the information set and verifying, during the check, whether the plurality of information items match at least one dataset in the database.

9. The method according to claim 1, wherein a part of the information set is at least partly recognized and is compared with a plurality of datasets in the database and, if the part of the information set does not match any of the datasets, replacing the information set by a dataset that has a closest match with the information set.

10. The method according to claim 1, wherein the database is a dynamic database containing automatically generated datasets.

11. The method according to claim 1, which comprises transmitting the information set to the database in a context of a generation of the identification element and storing the information set in the database as a dataset.

12. The method according to claim 11, wherein the piece of luggage is an item of flight luggage that is being sorted at an airport, and the method further comprises transmitting a dataset that is generated from the information set to all airports involved in the transportation of the respective piece of luggage.

13. The method according to claim 12, which comprises transmitting the dataset to a departure airport and, where applicable, to a destination airport and a transit airport.

14. The method according to claim 1, which comprises determining in the database when a given piece of luggage arrives at a luggage destination thereof, and deleting the dataset relating to the given piece of luggage after a predetermined period of time following an arrival at the luggage destination.

15. The method according to claim 14, which comprises deleting the dataset relating to the given piece of luggage after 24 hours following the arrival at the luggage destination.

16. The method according to claim 1, wherein:

the database at least partly includes information items pertaining to a flight schedule, the flight schedule including information items selected from the group consisting of flight numbers of incoming aircraft, flight numbers of departing aircraft, departure airport, landing airport, arrival airport, departure time, and landing time; and the check comprises verifying whether the part of the information set that has been recognized matches at least one of the items of the flight schedule that are stored in the database.

17. The method according to claim 16, wherein the check comprises performing a plausibility check whether the part of the information set that has been recognized is plausible.

18. A luggage sorting system, wherein each piece of luggage includes an identification element with an information set in the form of machine-readable code and human-readable code, comprising:

a database having stored therein a dataset for each piece of luggage, the dataset containing the machine-readable code and human-readable code of the information set;

an information acquisition apparatus for automatically acquiring the information set in the form of human-readable code from the identification element and subjecting the human-readable code to optical character recognition if the machine-readable code is not recognizable; and a checking unit configured to access the database in which the dataset with the machine-readable code and human-readable code is stored and to automatically verify, during a check, whether a part of the information set that has been recognized matches at least one dataset that is stored in the database.

* * * * *